United States Patent [19]

Yano

[11] Patent Number: 5,067,027

[45] Date of Patent: Nov. 19, 1991

[54] IMAGE DATA TRANSMISSION METHOD AND APPARATUS

[75] Inventor: Satoshi Yano, Kawasaki, Japan

[73] Assignee: Ricoh Company, Ltd., Tokyo, Japan

[21] Appl. No.: 392,044

[22] Filed: Aug. 10, 1989

[30] Foreign Application Priority Data

Aug. 18, 1988 [JP] Japan .................. 63-203787

[51] Int. Cl.⁵ .............................. H04N 1/00
[52] U.S. Cl. .................... 358/439; 358/445; 358/457
[58] Field of Search ............ 358/439, 445, 457; 359/434, 465

[56] References Cited

U.S. PATENT DOCUMENTS 4,153,916 5/1979 Miwa et al. ................ 358/439

FOREIGN PATENT DOCUMENTS 59-10066 1/1984 Japan .................. 358/439
59-81974 5/1984 Japan .................. 358/439

Primary Examiner—Edward L. Coles, Sr.
Attorney, Agent, or Firm—Oblon, Spivak, McClelland, Maier & Neustadt

[57] ABSTRACT

An image data transmission method in which a transmitter having a document reading system sends image data to a receiver having an image recording system, controls image data transmission as follows. The receiver lets the transmitter know an image recording characteristic of the image recording system provided in the receiver to the transmitter when the receiver is called. The transmitter adjusts a document reading characteristic of the document reading system so as to match the image recording characteristic of the image recording system provided in the receiver. The document is read by the document reading system provided in the transmitter according to the document reading characteristic. Image data obtained by reading the document is sent to the receiver. The image recording system records an image formed by the image data supplied from the transmitter according to the image recording characteristic.

15 Claims, 4 Drawing Sheets

IMAGE DATA TRANSMISSION METHOD AND APPARATUS

BACKGROUND OF THE INVENTION

The present invention generally relates to an image data transmission method and apparatus. More particularly, the present invention is directed to a facsimile communication method and a facsimile machine based on the same.

Generally, a facsimile machine is required to transmit image data of high quality. For this purpose, the facsimile machine has various image correction processes which are carried out for an image signal obtained by a document reading system. Examples of those processes are a shading correction process, an MTF (Modulation Transfer Function) correction process and γ-correction process. The shading correction process intends to suppress dispersion of density in the direction of a document reading line. The MTF correction process intends to correct a faded image. The γ-correction process intends to correct tone in reading a halftone image. The above-mentioned image correction processes are disclosed in Japanese Laid-Open Patent Application No. 62-186663, 62-186664, or 62-186665, for example.

Generally, quality of image transmitted from a transmitter is evaluated by an operator on the side of a receiver which receives the transmitted image and reproduces the original image. Generally, an image recording (printing) system provided in a facsimile has an image recording characteristic. Therefore, an image reproduced (recorded) from the received image data depends to a large extent on the image recording characteristic of the image recording system of the receiver fascimile machine.

That is, conventionally, an image correction process based on characteristics of the document reading system is executed in the transmitter facsimile machine, and on the other hand, no image correction process based on characteristics of the image recording mechanism is executed in the receiver facsimile machine. If the image correction process on the transmitter side does not match the image recording characteristic on the receiver side, the quality of reproduced image is not good. Particularly, the above disadvantage is conspicuous in a case where image recording resolution of the receiver side is high and thus the receiver is capable of outputting a reproduced image of high quality.

SUMMARY OF THE INVENTION

A general object of the present invention is to provide an improved image data transmission method and apparatus in which the aforementioned disadvantages are eliminated.

A more specific object of the present invention is to provide an image data transmission method in which a transmitter can send image data which has been corrected so as to match an image recording characteristic of a receiver.

The above objects of the present invention can be achieved by an image data transmission method wherein a transmitter having a document reading system sends image data to a receiver having an image recording system, the method comprising the steps of calling the receiver from the transmitter; letting the transmitter know an image recording characteristic of the image recording system provided in the receiver to the transmitter when the receiver is called, an image being recorded, by the image recording system, on a recording medium according to the image recording characteristic; adjusting a document reading characteristic of the document reading system so as to match the image recording characteristic of the image recording system provided in the receiver; reading the document according to the document reading characteristic through the document reading system provided in the transmitter; sending image data obtained by reading the document to the receiver; and recording, by the image recording system provided in the receiver, an image formed by the image data supplied from the transmitter according to the image recording characteristic.

Another object of the present invention is to provide an image data transmission apparatus based on the aforementioned image data transmission method.

The above object of the present invention can be achieved by an image data transmission apparatus comprising document reading means for reading a document and outputting digital image data according to a document reading characteristic; communication means, coupled to the document reading means, for communicating with a receiver, the digital image data being sent to a receiver through the communication means, the image data transmission apparatus being informed of an image recording characteristic of an image recording system of the receiver through the communication means, the image recording system of the receiver recording an image formed by the transmitted digital image data according to the image recording characteristic; and adjusting means, coupled to the document reading means and the communication means, for adjusting the document reading characteristic of the document reading means so as to match the informed image recording characteristic of the image recording system of the receiver.

The above object can also be achieved by an image data transmission apparatus, comprising document reading means for reading a document and outputting an analog image signal; conversion means for converting the analog image signal into digital image data according to a conversion characteristic; communication means, coupled to the conversion means, for communicating with a receiver, the digital image data being sent to a receiver through the communication means, the image data transmission apparatus being informed of an image recording characteristic of an image recording system of the receiver through the communication means, the image recording system recording an image formed by the transmitted digital image data according to the image recording characteristic; and adjusting means, coupled to the conversion reading means and the communication means, for adjusting the conversion characteristic of the conversion means so as to match the informed image recording characteristic of the image recording system of the receiver.

Additional objects, features and advantages of the present invention will become apparent from the following detailed description when read in conjunction with the accompanying drawings.

DESCRIPTION OF PREFERRED EMBODIMENTS

A description is given of a preferred embodiment of the present invention.

Figure 1:
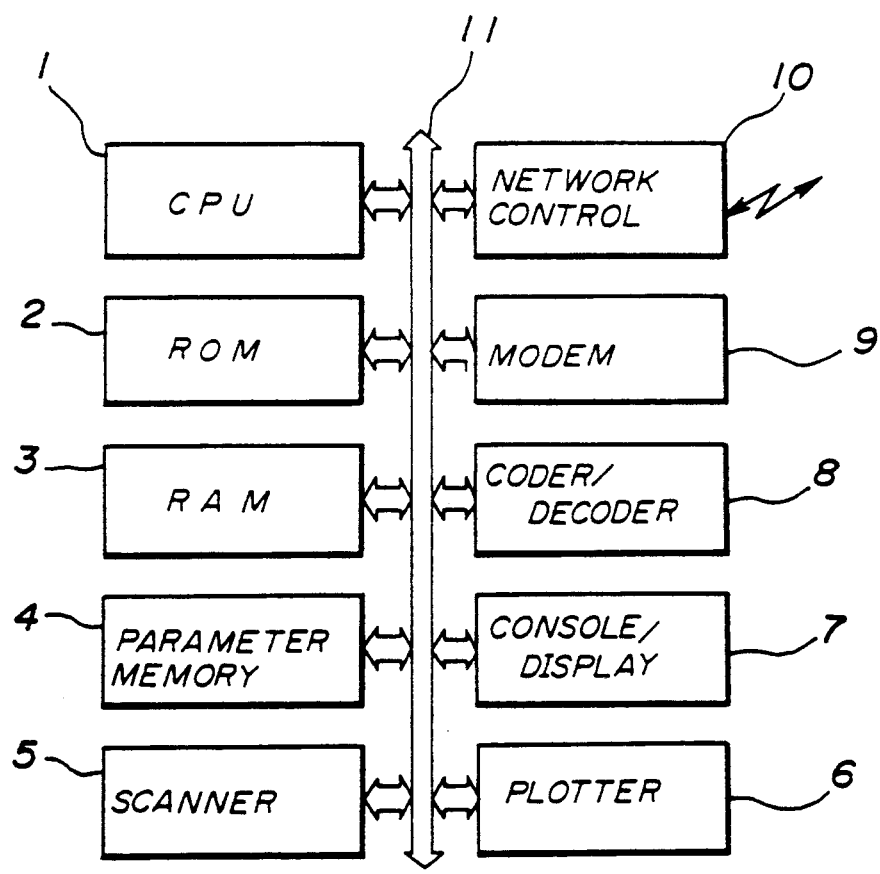
FIG. 1 is a block diagram of a facsimile machine according to a preferred embodiment of the present invention.

Referring to FIG. 1, a central processing unit (hereinafter simply referred to as a CPU) 1 controls the illustrated structural elements and controls a facsimile transmission procedure. A read only memory (hereinafter simply referred to as a ROM) 2 stores programs to be executed by the CPU 1, and various permanent data. A random access memory (hereinafter simply referred to as a RAM) 3 serves as a working area for the CPU 1. A parameter memory 4 stores information peculiar to this facsimile machine, such as an image recording characteristic of a plotter 6. A scanner 5 reads a document at a predetermined resolution level. The plotter 6 records (prints) reproduced image at a predetermined resolution level. A console/display panel 7 is made up of various keys for inputting information in the facsimile machine, and various indicators. A coder/decoder (CODEC) 8 codes and compresses digital data. Further, the coder/decoder 8 expands received compressed image data and generates original digital image data. A modulator/demodulator (MODEM) 9 carries out a modulation/demodulation process for digital data to be transmitted to an analog line or received from the analog line. A network control unit 10 connects the facsimile machine to the analog line. The network control unit 10 has the function of automatically calling a destination facsimile machine and automatically terminating a call sent from a destination facsimile machine. A system bus 11 mutually connects the CPU 1, ROM 2, RAM 3, parameter memory 4, scanner 5, plotter 6, console/display panel 7, coder/decoder 8, modulator/demodulator 9, and network control unit 10. Data is transmitted between those structural elements through the system bus 11.

Figure 2:
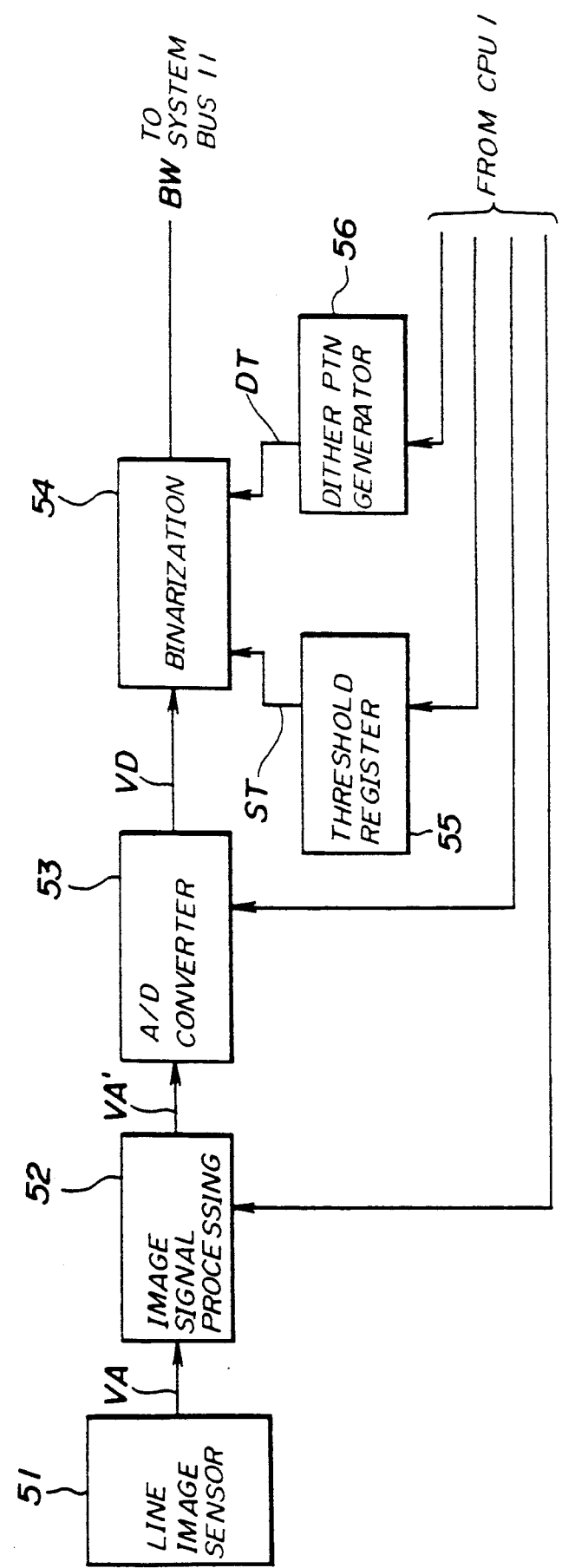
FIG. 2 is a block diagram of an image signal processing system provided in a scanner of the facsimile machine shown in FIG. 1.
Figure 3:
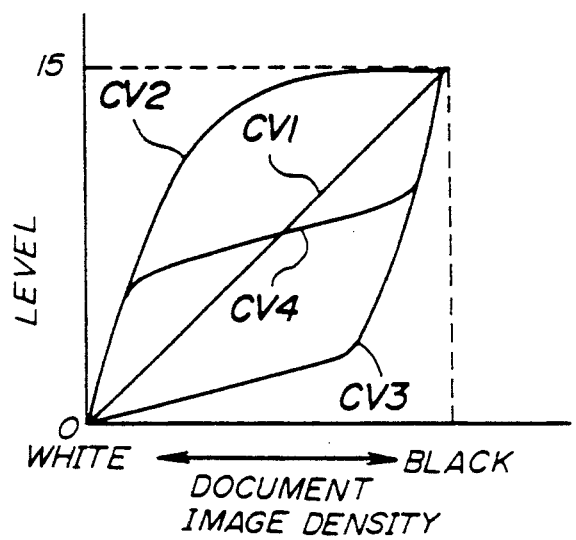
FIG. 3 is a graph of a γ-characteristic.

Referring to FIG. 2, there is illustrated a signal processing system provided in the scanner 5. Referring to FIG. 2, a line image sensor 51 optically reads an image on a document to be scanned and outputs a corresponding electric signal for every read line. The electric signal derived from the line image sensor 51 is an analog image signal VA in serial form, which is supplied to an image signal processor 52. The image signal processor 52 subjects the received analog image signal VA to various image correction processes such as shading correction, MTF correction and γ-correction. A resultant signal is supplied, as an analog image signal VA', to an analog-to-digital converter (hereinafter simply referred to as an A/D converter) 53. The A/D converter 53 converts the analog image signal VA' into a digital image signal VD, which consists of four bits, for example. The digital image signal VD is supplied to a binarization circuit 54.

The binarization circuit 54 compares the supplied digital image signal VD with a threshold signal ST generated by a threshold signal register 55 or a dither threshold signal DT generated by a dither pattern generator 56. Then, the binarization circuit 54 outputs a binary-valued signal BW of a bit 1 when the digital image signal VD is equal to or larger than the threshold signal ST or the dither threshold signal DT. On the other hand, when the digital image signal VD is smaller than the threshold signal ST or the dither threshold signal DT, the binarization circuit 54 outputs the binary-valued signal BW of a bit 0. The binary-valued signal BW thus formed is supplied, as a read image signal, to the system bus 11. The image signal processor 52 is controlled by the CPU 1. Similarly, A/D conversion characteristics of the A/D converter 53 are controlled by the CPU 1. The CPU 1 sets the threshold signal ST in the threshold signal register 55. The dither pattern generator 56 is controlled by the CPU 1.

When an image is recorded in a binary mode where each pixel is represented by "0" or "1", the plotter 6 can operate in selected one of three characteristics (image density), i.e., "low image density (light)", "normal image density (normal)" and "high image density (dark)". When an image is transmitted in the binary mode, the operator on the transmission side can set the document reading density to one of the three characteristics "low image density", "normal image density" and "high image density" through the console/display panel 7.

When the digital image signal VD supplied from the A/D converter 53 consists of four bits, the CPU 1 of the transmitter selects the threshold signal ST shown in the following table on the basis of a combination of the characteristic (image recording characteristic) of the plotter 6 of the receiver (RX) and the image density (document reading characteristic) set in the transmitter (TX).

TABLE

| Plotter (RX) | Image density (TX) | | |
|---|---|---|---|
| | high | normal | low |
| high | 4 | 6 | 8 |
| normal | 6 | 8 | 10 |
| low | 8 | 10 | 12 |

The threshold signal ST is set in the threshold signal register 55 so that the transmitter transmits image data read with the high image density to the receiver when the plotter characteristic of the receiver is set to the low image density, and transmits image data read with the low image density when the plotter characteristic of the receiver is set to the high image density.

When an image is printed through the plotter 6 in a halftone mode where each pixel is represented by multi-level data, the characteristic of the plotter 6 is set to one of the following four characteristics:

1) Tone (gradation) between a low image density range (white range) and a high image density range (black range) is linear.

2) Tone on the black range is poor.

3) Tone on the white range is poor.

4) Tone on an intermediate range between white and black is poor.

The document reading characteristic of the scanner 5 of the transmitter, that is, the γ-characteristic thereof is set to one of four characteristics CV1, CV2, CV3 and CV4 based on the characteristic of the plotter 6 of the receiver. The characteristic CV1 where tone changes linearly between the white and black ranges is selected when the plotter 6 is set to the above-mentioned characteristic (1). When the plotter 6 is set to the characteristic (2), the characteristic CV2 is selected where tone changes sharp between the white range and the intermediate range and changes gradually between the intermediate range and the black range. When the plotter 6 is set to the characteristic (3), the characteristic CV3 is selected where tone changes gradually between the white range the intermediate range and changes sharp between the intermediate range and the black range. When the plotter 6 is set to the characteristic (4), the characteristic CV4 is selected where tone changes sharp in the intermediate range and changes gradually in the other ranges.

A document reading characteristic for halftone image can be corrected by changing the conversion characteristic of the A/D converter 53 in place of the aforementioned adjustment of the γ-characteristic. In this case, the A/D converter 53 can be configured as shown in FIG. 4.

Figure 4:
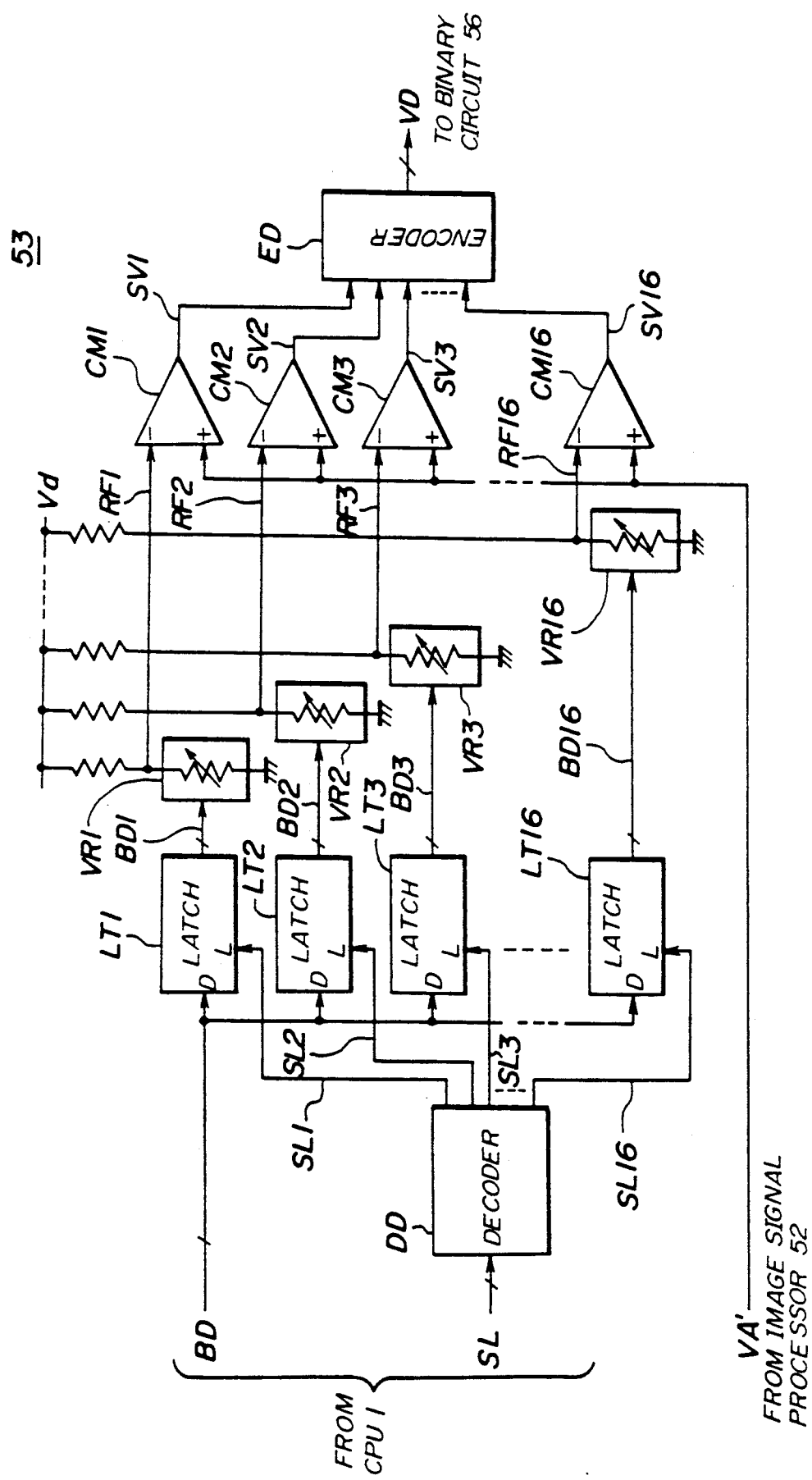
FIG. 4 is a circuit diagram of an analog-to-digital converter provided in the signal processing system shown in FIG. 2.

Referring to FIG. 4, variable resistors VR1 through VR16 connected between a high-potential power source Vd and ground generate reference level signals RF1 through RF16. Latch circuits LT1 through LT16 store data of voltage division ratios BD1 through BD16 to be supplied to the variable resistors VR1 through VR16, respectively. The latch circuits LT1 through LT16 have data input terminals D, to which data BD of voltage division ratios are supplied from the CPU 1 shown in FIG. 1. Comparators CM1 through CM16 have reference input terminals (inverting terminals), to which the reference level signals RF1 through RF16 derived from the variable resistors VR1 through VR16 are supplied, respectively.

A decoder DD generates selection signals SL1 through SL16 from selection data SL supplied from the CPU 1 in order to select one of the latch circuits LT1 through LT16 which store the voltage division data BD1 through BD16, respectively. The selection signals SL1 through SL16 are applied to latch signal input terminals L of the latch circuits LT1 through LT16, respectively.

The comparators CM1 through CM16 have comparison signal input terminals (non-inverting terminals), to which the analog image signal VA, supplied from the image signal processor 52 shown in FIG. 2 are supplied. The comparators CM1 through CM16 output signals SV1 through SV1 of a logically high level when the analog image signal VA' is larger than the respective reference level signals RF1 through RF16, respectively. On the other hand, when the analog image signal VA' is equal to or smaller than the reference level signals RF1 through RF16, the comparators CM1 through CM 16 output the signals SV1 through SV16 held at a logically low level, respectively. The signals SV1 through SV16 are supplied to an encoder ED.

The encoder ED forms digital data consisting of four bits which correspond to the logical state defined by the signals SV1 through SV16. Output data of the encoder ED is supplied, as the aforementioned digital image data VD, to the binarization circuit 54 shown in FIG. 2.

The characteristic setting operation is carried out as follows. The CPU 1 outputs the voltage division data BD to be set in the latch circuit LT1, while outputting the selection data SL for selecting the latch circuit LT1. Thus, the voltage division data BD1 is latched in the latch circuit LT1. Next the CPU 1 stops outputting the selection data SL for selecting the latch circuit CT1, and therefor outputs the selection data SL for selecting the latch circuit LT2 while outputting the voltage division data BD to be set in the latch circuit LT2. Thus, the voltage division data BD2 is set in the latch circuit LT2.

In this manner, the CPU 1 sequentially sets the voltage division data BD in the latch circuits LT1 through LT16. The variable resistors VR1 through VR16 generate the reference level signals RF1 through RF16 based on the characteristic determined by the CPU 1. The comparators CM1 through CM16 convert the analog image signal VA, into a digital signal consisting of the signals SV1 through SV16, which are encoded to the coded digital image signal V through the encode ED. The above-mentioned setting operation with respect to the A/D converter 53 is carried out before the scanner 5 reads the document.

Figure 5:
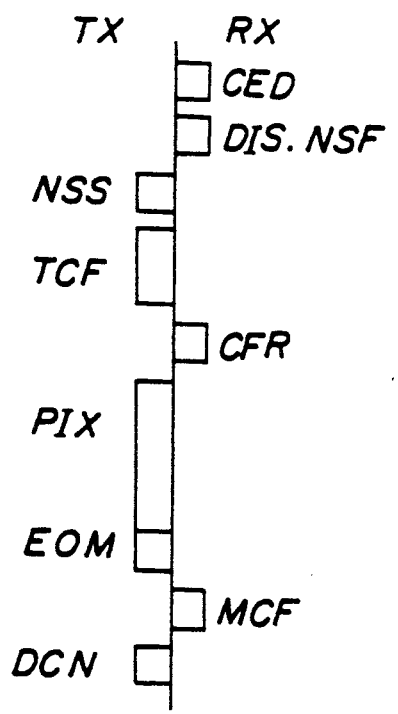
FIG. 5 is a timing chart of a transmission control procedure according to the preferred embodiment of the present invention.

A description is given of a procedure for transmitting image data by using the facsimile machine shown in FIG. 1, by referring to FIG. 5. Before a transmitter TX communicates with a receiver RX, the binary mode characteristic and the halftone mode characteristic for the plotter 6 are selected by the operator through the console/display panel 7, and are stored in the RAM 4 of the receiver RX.

When the transmitter TX calls the receiver RX, the receiver RX sends a called station identification signal CED which indicates that the receiver RX is a non-voice terminal. Subsequently, the receiver RX sends a digital identification signal DIS and a non-standard facility signal NSF, both of which let the transmitter TX know its own available functions. The non-standard facility signal NSF sent at this time includes information on the present binary characteristic (high image density, normal image density or low image density) and the present halftone characteristic (one of the aforementioned characteristics (1) to (4)) which are stored in the parameter memory 4.

Thus, the transmitter TX can get information on available transmission functions, as well as the binary mode characteristic and the halftone mode characteristic which are set in the plotter 6 of the receiver RX. Then the transmitter TX sends a non-standard facilities set-up signal NSS, which lets the receiver RX to know a transmission function to be used in this communication. Thereafter, the transmitter TX sends a training check signal TCF.

The receiver RX sets the transmission function designated by the transmitter TX in the RAM 3, and then receives the training check signal TCF. Then the receiver RX executes a conventional training check procedure. When the result of the training check procedure is good, the receiver RX sends the transmitter TX an acknowledgement signal CFR. Thereby, the transmitter TX starts reading the document set in the scanner 5. The scanner 5 outputs the digital image signal BW through the configuration shown in FIG. 2. The digital image signal BW is encoded and compressed through the coder/decoder 8 (FIG. 1), which generates image (pixel) information PIX. The transmitter TX transmits the image information PIX through the modulator/demodulator 9, the network control unit 10 and the analog line to the receiver RX. After the image information PIX is completely sent, the transmitter 10 sends an end-of-procedure signal EOP.

It is noted that when the transmitter TX transmits image information PIX in the binary mode, the CPU 1 of the transmitter TX selects the optimum threshold signal ST by referring to the aforementioned table based on the informed binary mode characteristic of the plotter 6 of the receiver and the document reading density set in its own parameter memory 4. The selected threshold signal ST is registered in the threshold signal register 55.

When the receiver RX receives the coded image information PIX, the coder/decoder 8 thereof decodes it to reproduce the original image signal, which is transferred to the plotter 6. When the image information PIX has been received and the reception condition is good, the receiver RX sends a message confirmation signal MCF.

When the transmitter TX receives the message confirmation signal MCF, it sends a disconnect signal DCN and releases the line from the connected state. When the receiver RX receives the disconnect signal DCN, it releases the line from the connected state. Thus, transmission of image data from the transmitter TX to the receiver RX is completed.

The transmitter TX reads the document by the scanner 5 in which the document reading characteristic suitable for the characteristic of the plotter 6 of the receiver RX is set. As a result, it is possible to obtain reproduced images of high quality at the receiver RX.

When the transmitter TX is set to the halftone mode, it provides the A/D converter provided therein with the conversion characteristic suitable for the halftone mode informed by the receiver RX before reading the document. In this case, halftone reading is carried out while the CPU 1 changes the dither threshold signal DT generated by the dither pattern generator 56 in synchronism with the reading operation of the line image sensor 51.

The configuration of the A/D converter 53 is not limited to the circuit shown in FIG. 4. An alternative circuit capable of changing the conversion characteristic may be used. In the case where the γ-characteristic is changed, the A/D converter 53 presents a fixed conversion characteristic.

The present invention is not limited to the embodiments, and variations and modifications may be made without departing from the scope of the present invention.

What is claimed is:

1. An image data transmission method wherein a transmitter having a document reading system sends image data to a receiver having an image recording system, said method comprising the steps of:
    calling said receiver from said transmitter;
    letting the transmitter know an image recording characteristic of said image recording system provided in said receiver to said transmitter when said receiver is called, an image being recorded, by said image recording system, on a recording medium according to said image recording characteristic;
    adjusting a document reading characteristic of said document reading system provided in the transmitter so as to match said image recording characteristic of the image recording system provided in said receiver, wherein when said image recording characteristic of the image recording system in the receiver is set to a low image density, said adjusting step adjusts said document reading characteristic to a high image density so as to match said image recording characteristic of the image recording system;
    reading the document according to said document reading characteristic by said document reading system provided in said transmitter;
    sending image data obtained by reading said document to said receiver; and
    recording, by said image recording system provided in the receiver, an image formed by said image data supplied from said transmitter according to said image recording characteristic.

2. An image data transmission method as claimed in claim 1, wherein said image data is facsimile data.

3. An image data transmission method wherein a transmitter having a document reading system sends image data to a receiver having an image recording system, said method comprising the steps of:
    calling said receiver from said transmitter;
    letting the transmitter know an image recording characteristic of said image recording system provided in said receiver to said transmitter when said receiver is called, an image being recorded, by said image recording system, on a recording medium according to said image recording characteristic;
    adjusting a document reading characteristic of said document reading system provided in the transmitter so as to match said image recording characteristic of the image recording system provided in said receiver, wherein when said image recording characteristic of the image recording system in the receiver is set to a high image density, said adjusting step adjusts said document reading characteristic to a low image density so as to match said image recording characteristic of the image recording system;
    reading the document according to said document reading characteristic by said document reading system provided in said transmitter;
    sending image data obtained by reading said document to said receiver; and
    recording, by said image recording system provided in the receiver, an image formed by said image data supplied from said transmitter according to said image recording characteristic.

4. An image data transmission method wherein a transmitter having a document reading system sends image data to a receiver having an image recording system, said method comprising the steps of:
    calling said receiver from said transmitter;
    letting the transmitter know an image recording characteristic of said image recording system provided in said receiver to said transmitter when said receiver is called, an image being recorded, by said image recording system, on a recording medium according to said image recording characteristic;
    adjusting a document reading characteristic of said document reading system provided in the transmitter so as to match said image recording characteristic of the image recording system provided in said receiver, wherein said document reading system of the transmitter includes a conversion circuit which compares an analog image signal obtained by reading the document with a threshold level and thus outputs binary level data to be transmitted to said receiver, and said adjusting step adjusts said document reading characteristic of the document reading system so as to match said image recording characteristic of the image recording system by changing said threshold level;

reading the document according to said document reading characteristic by said document reading system provided in said transmitter;

sending image data obtained by reading said document to said receiver; and recording, by said image recording system provided in the receiver, an image formed by said image data supplied from said transmitter according to said image recording characteristic.

5. An image data transmission method wherein a transmitter having a document reading system sends image data to a receiver having an image recording system, said method comprising the steps of:

calling said receiver from said transmitter;

letting the transmitter know an image recording characteristic of said image recording system provided in said receiver to said transmitter when said receiver is called, an image being recorded, by said image recording system, on a recording medium according to said image recording characteristic;

adjusting a document reading characteristic of said document reading system provided in the transmitter so as to match said image recording characteristic of the image recording system provided in said receiver, wherein said document reading system of the transmitter includes a signal processing circuit which subjects an analog image signal obtained by reading the document to a γ-correction process according to a γ-correction characteristic, and said adjusting step adjusts said document reading characteristic of the document reading system so as to match said image recording characteristic of the image recording system by changing said γ-correction characteristic;

reading the document according to said document reading characteristic by said document reading system provided in said transmitter;

sending image data obtained by reading said document to said receiver; and recording, by said image recording system provided in the receiver, an image formed by said image data supplied from said transmitter according to said image recording characteristic.

6. An image data transmission method wherein a transmitter having a document reading system sends image data to a receiver having an image recording system, said method comprising the steps of:

calling said receiver from said transmitter;

letting the transmitter know an image recording characteristic of said image recording system provided in said receiver to said transmitter when said receiver is called, an image being recorded, by said image recording system, on a recording medium according to said image recording characteristic;

adjusting a document reading characteristic of said document reading system provided in the transmitter so as to match said image recording characteristic of the image recording system provided in said receiver, wherein said document reading system of the transmitter includes an analog-to-digital converter which compares an analog image signal obtained by reading the document with a reference level and thus outputs multilevel digital data to be transmitted to said receiver, and said adjusting step adjusts said document reading characteristic of the document reading system so as to match said image recording characteristic of the image recording system by changing said reference level;

reading the document according to said document reading characteristic by said document reading system provided in said transmitter;

sending image data obtained by reading said document to said receiver; and recording, by said image recording system provided in the receiver, an image formed by said image data supplied from said transmitter according to said image recording characteristic.

7. An image data transmission apparatus comprising:

document reading means for reading a document and outputting digital image data according to a document reading characteristic communication means, coupled to said document reading means, for communicating with a receiver, said digital image data being sent to a receiver through said communication means, said image data transmission apparatus being informed of an image recording characteristic of an image recording system of the receiver through said communication means, said image recording system of the receiver recording an image formed by the transmitted digital image data according to said image recording characteristic;

adjusting means, coupled to said document reading means and said communication means, for adjusting said document reading characteristic of said document reading means so as to match said informed image recording characteristic of the image recording system of the receiver; and wherein said document reading means comprises image sensor means for optically reading the document and outputting an analog image signal, and converting means, coupled to said image sensor means, for comparing said analog image signal with a threshold signal and outputting said digital image data based on the comparison results, and wherein said adjusting means changes said threshold signal so that said document reading characteristic of said document reading means can match said informed image recording characteristic of the image recording system of the receiver.

8. An image data transmission apparatus as claimed in claim 7, further comprising:

image recording means for recording an image formed by image data supplied from a transmitter through said communication means on a recording medium according to an image recording characteristic; and memory means, coupled to said image recording means, for storing said image recording characteristic.

9. An image data transmission apparatus as claimed in claim 8, wherein said memory means stores a plurality of image recording characteristics, and said adjusting means selects one of said image recording characteristics which matches said document reading characteristic of said image recording system of said receiver.

10. An image data transmission apparatus as claimed in claim 9, further comprising input means for inputting said plurality of image recording characteristics to be set in said memory means.

11. An image data transmission apparatus as claimed in claim 7, wherein said digital image data is binary-valued data.

12. An image data transmission apparatus comprising:

document reading means for reading a document and outputting digital image data according to a document reading characteristic, communication means, coupled to said document reading means, for communicating with a receiver, said digital image data being sent to a receiver through said communication means, said image data transmission apparatus being informed of an image recording characteristic of an image recording system of the receiver through said communication means, said image recording system of the receiver recording an image formed by the transmitted digital image data according to said image recording characteristic;

adjusting means, coupled to said document reading means and said communication means, for adjusting said document reading characteristic of said document reading means so as to match said informed image recording characteristic of the image recording system of the receiver; and wherein said document reading means comprises image sensor means for optically reading the document and outputting an analog image signal, and converting means, coupled to said image sensor means, for subjecting said analog image signal to a $\gamma$-correction process according to a $\gamma$-correction characteristic, and converting means, coupled to said signal processing means, for comparing said $\gamma$-corrected analog image signal with a threshold signal and outputting said digital image data based on the comparison results, and wherein said adjusting means changes said $\gamma$-correction characteristic so that said document reading characteristic of said document reading means can match said informed image recording characteristic of the image recording system of the receiver.

13. An image data transmission apparatus as claimed in claim 12, wherein said digital image data is multilevel image data.

14. An image data transmission apparatus comprising:

document reading means for reading a document and outputting digital image data according to a document reading characteristic, communication means, coupled to said document reading means, for communicating with a receiver, said digital image data being sent to a receiver through said communication means, said image data transmission apparatus being informed of an image recording characteristic of an image recording system of the receiver through said communication means, said image recording system of the receiver recording an image formed by the transmitted digital image data according to said image recording characteristic;

adjusting means, coupled to said document reading means and said communication means, for adjusting said document reading characteristic of said document reading means so as to match said informed image recording characteristic of the image recording system of the receiver, wherein when said image recording characteristic of the image recording system in the receiver is set to a low image density, said adjusting means adjusts said document reading characteristic to a high image density so as to match said informed image recording characteristic of the image recording system of the receiver.

15. An image data transmission apparatus comprising:

document reading means for reading a document and outputting digital image data according to a document reading characteristic, communication means, coupled to said document reading means, for communicating with a receiver, said digital image data being sent to a receiver through said communication means, said image data transmission apparatus being informed of an image recording characteristic of an image recording system of the receiver through said communication means, said image recording system of the receiver recording an image formed by the transmitted digital image data according to said image recording characteristic; and adjusting means, coupled to said document reading means and said communication means, for adjusting said document reading characteristic of said document reading means so as to match said informed image recording characteristic of the image recording system of the receiver, wherein when said image recording characteristic of the image recording system in the receiver is set to a low image density, said adjusting means adjusts said document reading characteristic to a high image density so as to match said informed image recording characteristic of the image recording system of the receiver.

* * * * *